United States Patent [19]
Pezzillo

[11] 3,967,498
[45] July 6, 1976

[54] TIRE DEFECT DETECTOR
[75] Inventor: Rinaldo F. Pezzillo, Levittown, Pa.
[73] Assignee: Super Tire Engineering Company, Pennsauken, N.J.
[22] Filed: Sept. 16, 1975
[21] Appl. No.: 613,970

[52] U.S. Cl. .................................. 73/146; 73/552
[51] Int. Cl.² ....................................... G01M 17/02
[58] Field of Search ............... 73/146, 69, 552, 159

[56] References Cited
UNITED STATES PATENTS
2,345,679  4/1944  Linse .................................. 73/146
3,361,225  1/1968  Nichols .............................. 73/552

Primary Examiner—Donald O. Woodiel
Attorney, Agent, or Firm—Paul & Paul

[57] ABSTRACT

Apparatus is disclosed for detecting separations or air pockets hidden within truck tire casings which are being inspected to determine their fitness for retreading. The operator holds a roller against the inner surface of the tire casing which is being rotated. Regularly spaced cams which project from the inner surface of the roller engage and lift one or more impact hammers. The hammer when released strikes an anvil mounted on the side frame of the roller and the ensuing shock is transmitted through the axle to the roller. A microphone mounted near to the roller picks up the sounds produced by the shocks. Any variations in the sound frequencies, such as would be produced by an air pocket, are detected electronically and an alarm signal is given. The apparatus has broader application.

18 Claims, 8 Drawing Figures

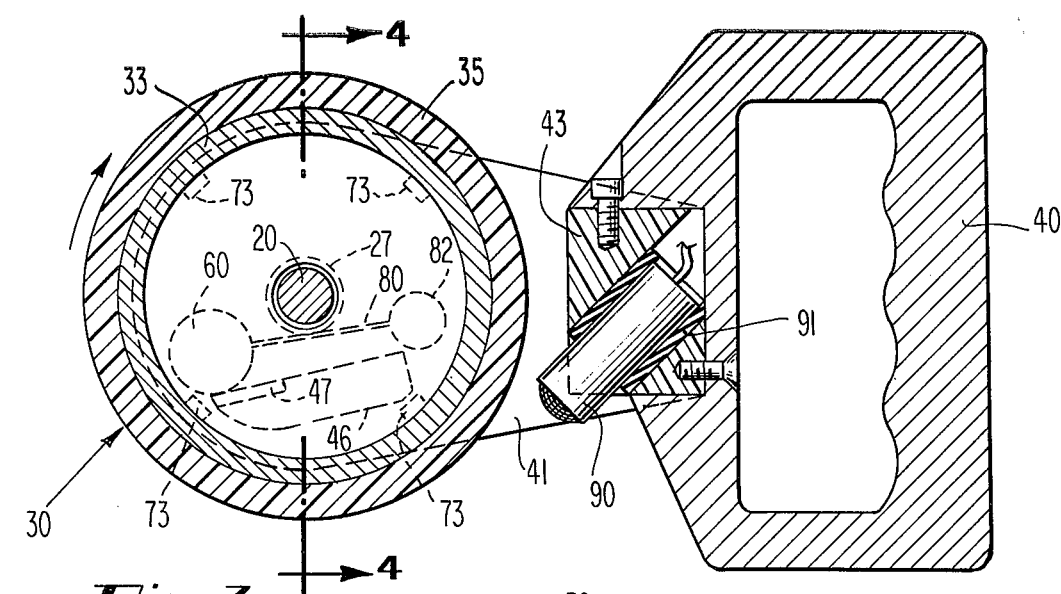
Fig. 3
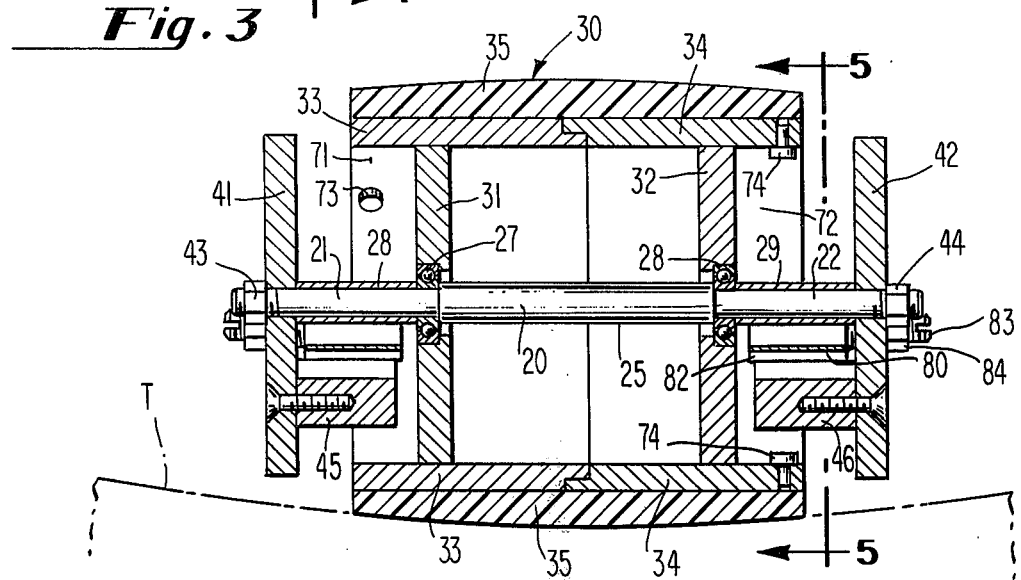
Fig. 4
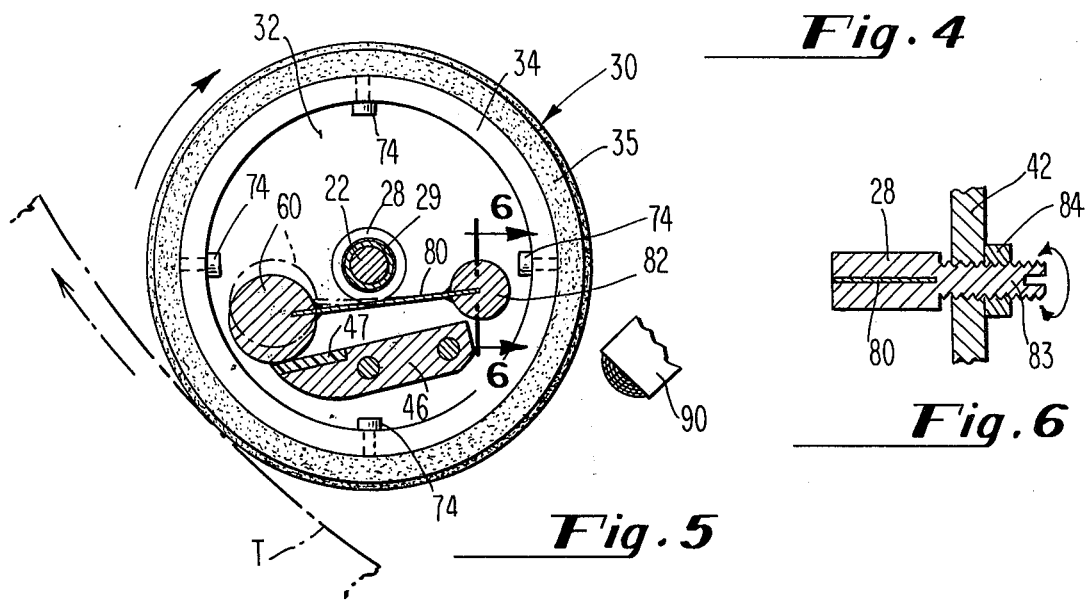
Fig. 5
Fig. 6

TIRE DEFECT DETECTOR

BACKGROUND OF THE INVENTION

The present invention relates broadly to apparatus for detecting and locating hidden variations in the density of a mass having a smooth outer surface.

The invention has particular application in the detection and location of separations or air pockets hidden within truck tire casings during inspection to determine fitness for re-treading.

As is well known, thousands of heavy duty trucks, notably tractor-trailers, travel the highways of the country every day, each equipped with a plurality of heavy duty tires. A typical tractor-trailer may, for example, have as many as 18 heavy duty tires engaging the roadway at the same time. Such tires involve high original cost and it is common practice, when the tread is worn, to inspect the casing to determine whether or not it is in sufficiently good shape to warrant re-treading. Thousands of re-treaded truck tires roll along the highways every day.

In inspecting a tire casing to determine if it is fit for re-treading, it is difficult but important to determine whether there are any defects hidden from visual detection. In the case of bias-ply tires, the most common hidden defect is that of a separation between the plies of the fabric, or a separation between the plies and the rubber. Such separations create pockets which trap air. Such air pockets disqualify the tire as a candidate for re-treading. For if the pocket or separation is not detected and the tire is retreaded and used, the pocketed air will become heated to high temperatures during use, and will expand and place severe stresses on the casing, sufficient in many cases to cause blow-outs. This, of course, is to be avoided, not only because the re-treading will have been wasted but also because of the danger of life and property which may result from the blow-out.

To detect such separations hidden within the tire casing, it is known in the prior art to have a workman tap the casing repeatedly with a hammer and to listen for changes in the tonal quality of the sound produced. Such method is, however, not dependable in that some areas of the tire casing may easily be missed without the workman knowing that he has missed them. Moreover, his tapping may not be uniform in intensity. Also, the workman may not be able to detect differences in the sounds produced because of the environmental or ambient noise level in the area in which he is working.

It is also known in the prior art to use ultrasonic methods for detecting separations in tire casings. However, in such prior art method, the ultrasonic frequencies are applied to one surface of the casing (either the exterior or interior surface) and detected at the other. Detection of separations is made difficult by interference caused by the presence of stones, nails, glass and the like which are lodged in the tire tread. In contrast to such prior art ultrasonic system, in the system of the present invention an impact is applied to the interior surface of the casing and the sound waves produced are detected at the same surface.

SUMMARY OF THE PRESENT INVENTION

A specific object of the present invention is to provide apparatus for detecting and locating air pockets caused by separations within tire casings, particularly truck tire casings, which are candidates for re-treading.

The foregoing specific object is accomplished according to the present invention, by an apparatus which mechanically applies impacts of uniform intensity to the interior surface of the casing at regularly spaced intervals. Sounds produced by the impacts are detected electronically, and, by electronic comparison means, variations, such as would be caused by air pockets or separations, are sensed and a signal generated to signify the presence of an air pocket or separation within the tire casing.

While the apparatus of the present invention was developed to solve the specific problems relating to re-treading of truck tires, as discussed above, it is recognized that the apparatus has wide application and may be used broadly wherever it desired to detect differences in the density or thickness of a mass hidden behind a substantially smooth exterior surface to which the apparatus may be applied. For example, the apparatus may be used to locate studs and beams behind the wall or ceiling or floor of a room or building.

BRIEF DESCRIPTION OF THE DRAWINGS

FIG. 3 is a view, in section, along the line 3—3 of FIG. 1.

FIG. 4 is a view, in section, along the line 4—4 of FIG. 3.

FIG. 5 is a view, in section, along the line 5—5 of FIG. 4.

FIG. 6 is a view, in section, along the line 6—6 of FIG. 5.

DETAILED DESCRIPTION OF THE PREFERRED EMBODIMENTS

Figure 1:
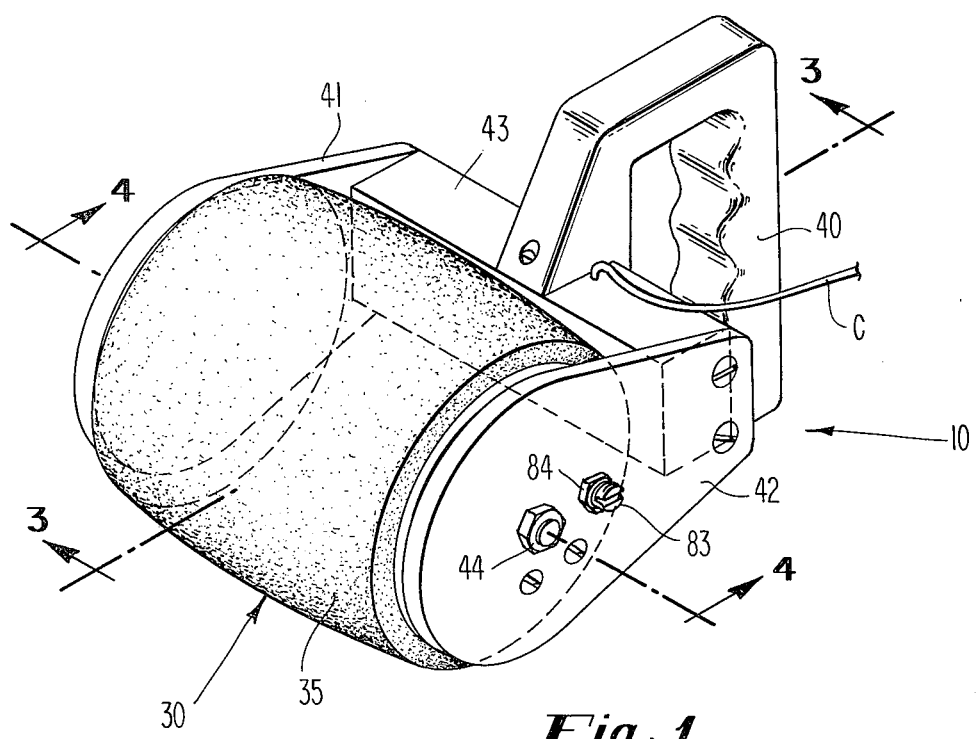
FIG. 1 is a perspective view of the apparatus of the present invention.
Figure 2:
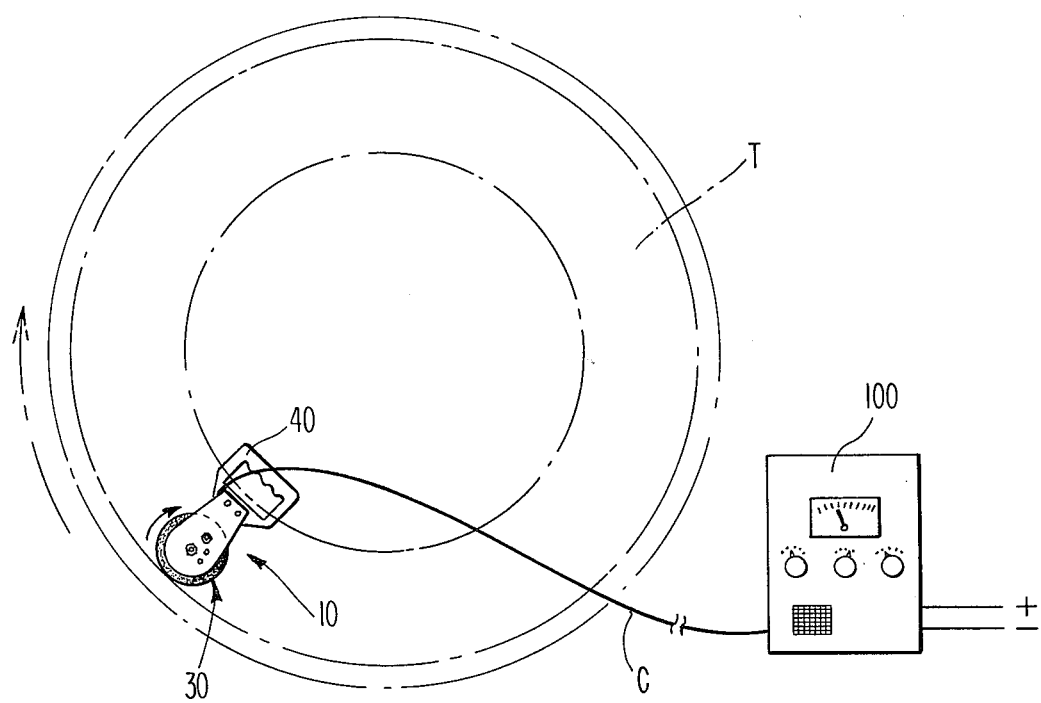
FIG. 2 is a side elevational view showing the device being used on the interior surface of a truck-tire casing.

Referring now to the drawings, the device or apparatus of the present invention is seen in FIGS. 1 and 2 and identified generally by the reference numeral 10. The device 10 consists of a yoke-like frame having side frame members 41 and 42 connected by cross-member 43 to which a handle portion 40 is connected. Supported in the side frame members 41 and 42 and extending therebetween is shaft or axle 20 having threaded ends for receiving the nuts 44, as seen best in FIG. 4.

The center portion of shaft 20 has an enlarged diameter at 25 forming shoulders against which the bearings 27 and 28 abut. The ends portions of shaft 20, identified 21 and 22, are of reduced diameter. These reduced-diameter end portions receive spacer sleeves 28 and 29, the inward ends of which abut against the bearings 27 and 28.

Bearings 27 and 28 support the hubs 31 and 32 of a pair of wheels 33, 34 which may be interlocked by a lap joint, as shown. The surface of the interlocked wheels is covered with a molded urethane surface 35, forming a roller 30.

Projecting inwardly from the inner circumferential surface of roller 30, into the hollow portions 71 and 72 at each end of the roller 30, are a series of lifter cams identified 73 at the left end of the roller and 74 at the right end. These cams are uniformly spaced, with the cams 73 at one end of the roller being offset relative to the cams 74 at the other end of the roller. In a preferred embodiment, four lifter cams are used at each end of the roller, spaced 90° apart. The cams 73 and 74 are offset 45° relative to each other. These cams function to lift the impact hammers, as will now be described.

Impact hammer means are provided at each end of the roller. The impact hammer means at one end are identical, or substantially identical, to the impact hammer means at the other end. Accordingly, it will be necessary to describe the means at but one end of the roller.

As seen best in FIG. 6, extending inwardly from the side frame 42 is a stud 82 having a threaded end 83 which projects outwardly from side frame 42 and is provided with a notch for receiving an adjusting tool, such as a screw driver. A lock nut 84 holds the threaded portion 83 tightly in position, following adjustment. Secured in stud 82 is one end of a leaf spring 80. Mounted at the opposite end of leaf spring 80 is an impact hammer 60, as clearly seen in FIG. 5. In preferred form, impact hammer 60 is a steel cylinder. Secured to side frame 42 and extending inwardly therefrom is an anvil 46 so positioned as to be adapted to be stuck by impact hammer 60. Anvil 46 is provided with a molded urethane portion 47 which receives the blow or impact of hammer 60. The function of the urethane portion 47 is to dampen the vibration to reduce the ringing period, and to reduce the sound of the hammer as it strikes the anvil.

Mounted in the cross member 43 and projecting toward the surface of roller 30 is a sound wave-to-electrical wave transducer, such as microphone 90. Microphone 90 is protected by a rubber insulating sleeve 91.

In the preferred form, as already indicated, identical or substantially identical impact hammer means are provided at both ends of the roller. The impact hammer means at the right end of the roller, as viewed looking toward the handle in FIG. 1, are seen in FIG. 5 and have just been described. The impact hammer means at the left end of the roller are shown in phantom in FIG. 3. Identical reference numbers have been given to identical components.

Without intending to be limited to specific dimensions and materials, the following are illustrative of a device which has been built and used in accordance with the teaching of the present invention: The two wheels which form roller 30 are made of aluminum and have an outside diameter of 3 3/16 inches. The annulus of the wheels has a thickness of ¼ inch. The outer surface of the interlocked aluminum wheels are covered with a urethane molding having a maximum thickness at the center and reducing to a minimum thickness at the opposite ends, thereby providing a surface curvature corresponding approximately to that of the expected curvature of the inner surface of a tire casing which is to be contacted during inspection, as illustrated in FIG. 2. The overall maximum diameter at the center of the roller, including the molded urethane surface, is 4 inches. The roller axle 20 is a shaft 6 inches long. The side frames 41 and 42 are ¼ inch thick and are aluminum. The spacer sleeves 28 and 29 between the inner surface of the side frames and the bearings 27 and 28 are 15/16 of an inch in length. The impact hammer 60 may be a cylinder of cold drawn steel, having a length of 7/8 inch and a diameter of ¾ inch. The steel leaf spring 80 may be 0.022 inch thick and 7/8 inch wide. The lifter cams 73, 74 may be Nylon pins and may be four in number at each end of the roller, spaced 90° apart. As already indicated, the lifter pins at one end of the roller are staggered.

In operation, the mechanical device 10 of the present invention is placed manually by the workman against the inner surface of the tire casing T which is to be inspected. This is illustrated in FIG. 2. The tire casing T is driven rotationally, by means not shown, preferably at a rate of four revolutions per minute, or one revolution every fifteen seconds. Rotation of tire casing T, clockwise as viewed in FIG. 2, drives the roller 30 rotationally clockwise, as indicated by the solid arrow in FIG. 2.

Referring now to FIG. 5, it will be seen that as the roller 30 rotates, the lifter 74 will engage the hammer 60 and lift it from the solid-line position shown in FIG. 5 to the phantom position. After the lifter 74 has passed, the hammer will be returned by the action of leaf spring 80 and will impact the urethane insert 47 of the anvil 46. This impact or shock will be transmitted from the anvil 46 (see FIG. 4) through the side frame 42 to the axle 20, and thence through the hubs 31 and 32 to the roller 30. This impact will be transmitted by roller 30 to the inner surface of the tire casing T, and the sound waves produced by the impact of roller 30 against the tire casing T will be picked up by microphone 90 and will be translated into electrical waves.

If the spot or area of the tire casing receiving the impact of roller 30 contains a ply separaton or air pocket, the sound produced will be different from that which is produced in the absence of such ply separation or pocket. The difference will be in the frequency of the sound waves produced. This difference in sound-wave frequency is translated by the microphone transducer 90 into electrical waves of different frequencies which are detected and recognized by apparatus illustrated in FIGS. 7 and 8, later to be described.

Figure 7:
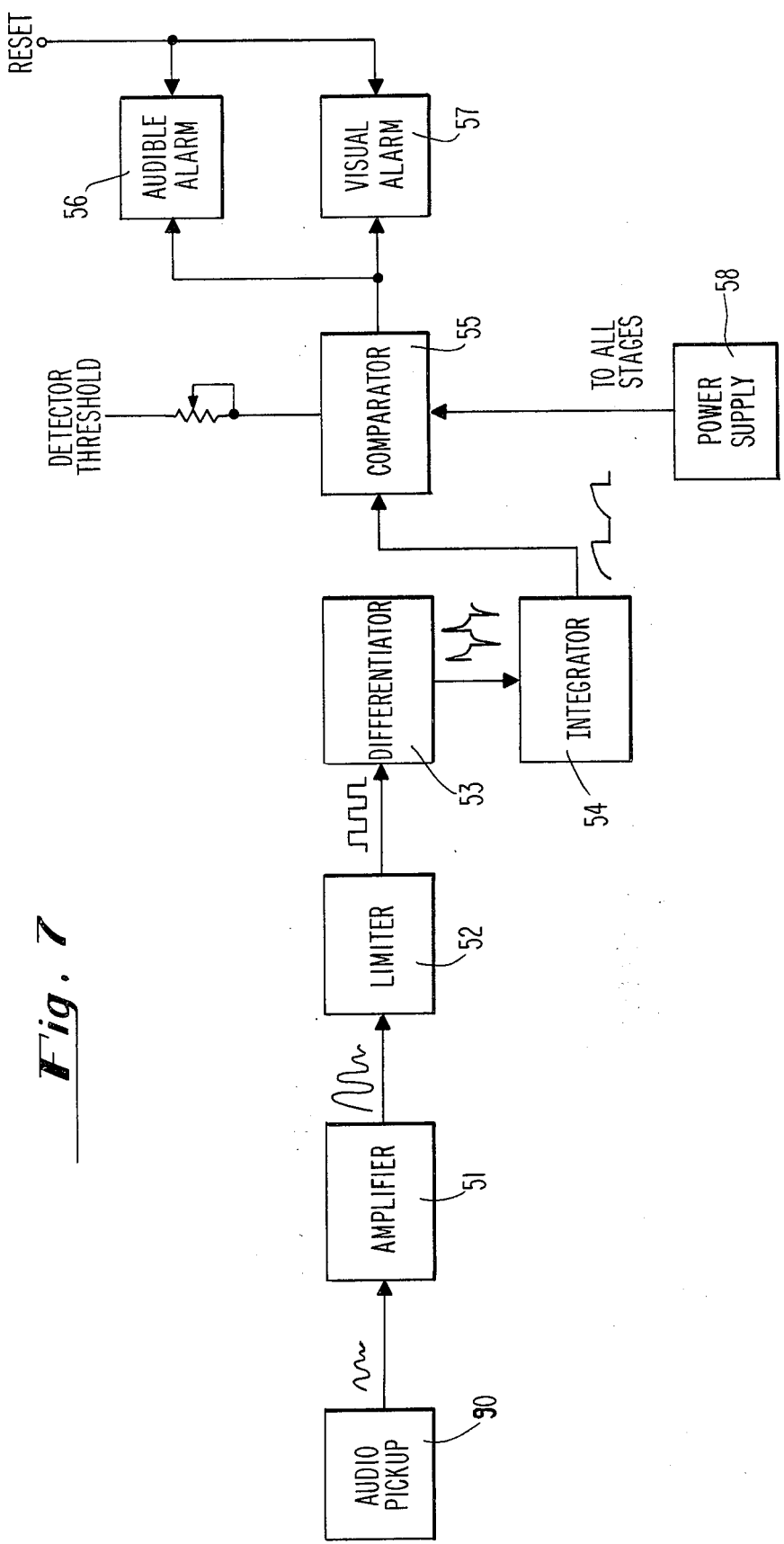
FIG. 7 is a block diagram of the electronic control apparatus.
Figure 8:
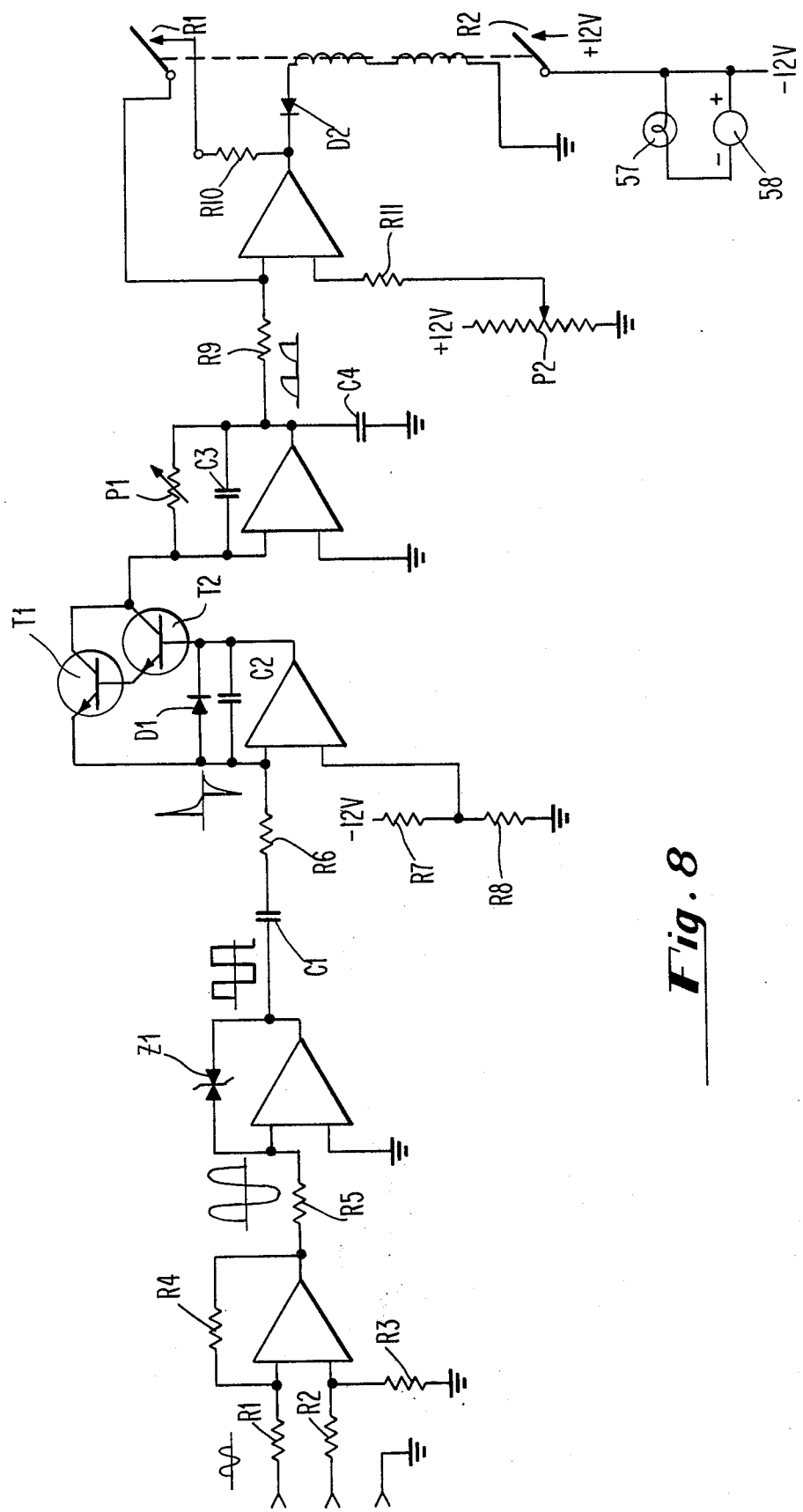
FIG. 8 is a circuit diagram of the control apparatus.

It will be seen that with four cams or hammer-lifters being used at each side of the roller, and with the lifters on one side being offset or staggered 45° with respect to the lifters on the other side, one or the other hammer is lifted every 45° of rotation of the roller. Thus, an impact is applied to the tire casing eight times per revolution of the roller. It has been determined that for a standard size truck tire, if, as is preferred, the tire casing is rotated once every 15 seconds, the time interval between impacts will be of the order of 165 millisecond. And, if the sound duration of each blow is dampened and limited to approximately 5 milliseconds, as is contemplated by the present invention, a time interval of approximately 160 milliseconds will occur between blows. The electronic detector apparatus illustrated in FIGS. 7 and 8 is capable of reading the signal in 2 milliseconds. Thus, there is ample spacing between signals to avoid one signal being contaminated by an adjacent signal.

As previously indicated, FIGS. 7 and 8 are, respectively, a block diagram and a circuit diagram of a control system suitable for use with the device of the present invention. The wave forms of the signals delivered by the various components are illustrated. It will be understood that the wave forms shown are illustrative and are not intended to be accurate representations.

Referring now to FIG. 7, the sound signals picked up by the microphone 90, identified as audio pick up 90 in FIG. 7, are converted into electrical signals which are amplified in amplifier 51 and then applied to an amplitude limiter 52 the function of which is to remove all amplitude variations. It is to be understood that the control system used with the mechanical device of the present apparatus is frequency responsive, and that the function of the electronic system is to detect significant differences in sound frequencies. Such differences are produced when the roller 30 impacts the surface at that spot on the tire casing which has a separation or air pocket hidden thereneath in contrast with the sound frequency produced in the absence of such a separation.

The amplitude-limited signals delivered by limiter 52 are applied to a differentiator 53 and the output of the differentiator 53 is applied to an integrator 54. The output of integrator 54 is applied to the input of comparator 55 where it is compared to a pre-selected threshold signal. Such threshold signal may, for example, be +7 volts. In the present example, signals delivered by integrator 54 having a magnitude of less than +7 volts, for example +5 volts, would indicate that the tire casing is good at that spot. On the other hand, if the integrator output signal should exceed +7 volts, the comparator 55 will deliver a signal to the audible alarm 56 and to the visual lamp 57 indicating that a bad spot has been detected.

The circuit details of the component parts of the control system shown in block diagram in FIG. 7 are shown in FIG. 8. No claim is, however, made in the present application to the novelty of the control system per se.

Typical values and types for the various components of the circuit of FIG. 8 are given below. It is to be understood that these values and types are merely representative and that other values and types may be substituted therefor.

| Component | Value or Type |
| --- | --- |
| R1,R2 | 100 ohms |
| R6 | 1K |
| R8 | 2K |
| R10 | 3K |
| R5,R7,R9,R11 | 10K |
| R3,R4 | 200K |
| P1,P2 | 10K |
| C4 | 0.05 |
| C1,C2 | 0.1 |
| C3 | 1.0 |
| D1,D2 | 1N4005 |
| T1,T2 | 2N2222 |
| Z1 | 10 Volts |

Referring again to FIG. 2, it should be mentioned that when the tire casing is inspected, the beads of the casing are held spread apart while the casing is rotated. The width of the roller 30 is substantially less than the width of the casing in its spread condition. Thus, after one (or more) revolutions of the casing, the operator shifts the roller 30 laterally to a new position which overlaps the first, and the inspection is repeated. Such shifting, and repeat of inspection is repeated a third or even a fourth time. It is advantageous that the roller 30 have a width substantially less than the width of the casing for this enables the device to locate the separation more accurately.

It should also be mentioned that the bearings 27 and 28 are designed to provide a close fit between the shaft 20 and the hubs 31, 32 so that the impacts to the anvil 46 will be transmitted without appreciable loss to the roller 30.

Operation of the device provided by the present invention is fast and requires no special skill on the part of the operator. It can be used in the presence of normal ambient noise. The intensity of the impact is readily adjustable by adjusting the tension of the leaf spring 80.

The electronic detecting system illustrated in FIGS. 7 and 8 may be housed in a cabinet indentified 100 in FIG. 2 and connected to the microphone 90 by a cord C.

The presently preferred form of apparatus, described above, utilizes a mechanically-driven impact hammer. It is contemplated that in some cases an electro-magnetically driven hammer will be used. Such electro-magnetic hammer means will be mounted on the outer surface of the side frames and the side frames (or the roller) are shocked directly. The need for the inwardly projecting anvil is eliminated, as is the need for the hammer-receiving recesses in the roller.

Other modifications will occur to those skilled in the art without departing from the basic concepts of the present invention.

What is claimed is:

1. Apparatus for detecting the presence and location of variations in the density of material having a substantially smooth exterior surface, said apparatus comprising:
   a. a roller for engaging the surface of said material;
   b. an axle supporting said roller;
   c. side frame means supporting said axle;
   d. impact hammer means supported on said side frame means;
   e. means for causing said impact hammer means to strike and shock said side frame means, axle, and roller;
   f. transducer means mounted adjacent said roller and adapted to be energized by sound waves produced by the roller when shocked and to generate electrical signals in response thereto; and
   g. electronic circuit means, including comparator means, for detecting differences in said generated electrical signals caused by differences in sound waves for producing an indicator signal in response to differences of a predetermined magnitude.

2. Apparatus according to claim 1 wherein:
   a. said roller is cylindrical and has central hub and hollow end portions;
   b. said impact hammer means are positioned at least partially within said hollow end portions of said roller;
   c. anvil means are secured to said side frame means;
   d. said anvil means project inwardly toward the hollow portions of said roller and adapted to be contacted by said impact hammer means.

3. Apparatus according to claim 1 wherein:
   a. said means for causing said impact hammer means to strike and shock said side frame means, axle, and roller are leaf spring means, one end of which is secured to said side frame means and the other end secured to said impact hammer means;
   b. cam means project inwardly from the inner surface of said roller for lifting said impact hammer means against the tension of said leaf spring means, whereby said impact hammer means, when released by said cam means, strikes and shocks said side frame means, axle and roller.

4. Apparatus according to claim 1 wherein:
   a. said transducer means is a microphone.

5. Apparatus according to claim 1 wherein:

a. anvil means are provided secured to said side frame means;
   b. said anvil means project inwardly toward said roller and adapted to be struck by said impact hammer means.
6. Apparatus according to claim 1 wherein:
   a. said roller is aluminum having a molded urethane surface covering.
7. Apparatus according to claim 3 wherein:
   a. means are provided for adjusting the tension of said leaf spring means.
8. Apparatus according to claim 3 wherein:
   a. impact hammer means are provided at opposite ends of said roller;
   b. cam means are provided at opposite ends of said roller.
9. Apparatus according to claim 8 wherein:
   a. said cam means at one end of said roller are staggered relative to the cam means to the opposite end of said roller.
10. Apparatus according to claim 1 wherein:
   a. said transducer means, in response to variations in sound waves produced by said shocked roller, generates electrical signals of varying frequencies;
   b. said electronic circuit detecting means is adapted to detect differences in the frequencies of the generated signals.
11. Apparatus according to claim 2 wherein:
   a. said means for causing said impact hammer means to strike and shock said side frame means, axle, and roller are leaf spring means, one end of which is secured to said side frame means and the other end secured to said impact hammer means;
   b. cam means project inwardly from the inner surface of said roller for lifting said impact hammer means against the tension of said leaf spring means, whereby said impact hammer means, when released by said cam means, strikes and shocks said side frame means, axle and roller.
12. Apparatus according to claim 11 wherein:
   a. said transducer means is a microphone.
13. Apparatus according to claim 12 wherein:
   a. anvil means are provided secured to said side frame means;
   b. said anvil means project inwardly toward said roller and adapted to be struck by said impact hammer means.
14. Apparatus according to claim 13 wherein:
   a. said roller is aluminum having a molded urethane surface covering.
15. Apparatus according to claim 14 wherein:
   a. means are provided for adjusting the tension of said leaf spring means.
16. Apparatus according to claim 15 wherein:
   a. impact hammer means are provided at opposite ends of said roller;
   b. cam means are provided at opposite ends of said roller.
17. Apparatus according to claim 16 wherein:
   a. said cam means at one end of said roller are staggered relative to the cam means at the opposite end of said roller.
18. Apparatus according to claim 17 wherein:
   a. said transducer means, in response to variations in sound waves produced by said shocked roller, generates electrical signals of varying frequencies;
   b. said electronic circuit detecting means is adapted to detect differences in the frequencies of the generated signals.

* * * * *